(12) United States Patent
Masewicz et al.

(10) Patent No.: US 8,489,457 B2
(45) Date of Patent: *Jul. 16, 2013

(54) SYSTEMS AND METHODS FOR DYNAMIC EVENT PRODUCTION AND MANAGEMENT (75) Inventors: Robert Masewicz, La Crosse, WI (US); Jeanette Ehnerd, La Crosse, WI (US)

(73) Assignee: Total Sports Entertainment, La Crosse, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/488,813

(22) Filed: Jun. 5, 2012

(65) Prior Publication Data
US 2012/0246675 A1   Sep. 27, 2012

Related U.S. Application Data (63) Continuation of application No. 12/204,455, filed on Sep. 4, 2008, now Pat. No. 8,195,515.

(60) Provisional application No. 60/970,152, filed on Sep. 5, 2007.

(51) Int. Cl.
*G06Q 30/00* (2012.01)

(52) U.S. Cl.
USPC ..................... 705/14.52; 705/14.58

(58) Field of Classification Search
USPC .......................... 705/14.52, 14.58
See application file for complete search history.

(56) References Cited

U.S. PATENT DOCUMENTS

| | | |
|---|---|---|
| 5,841,659 A | 11/1998 | Tanaka et al. |
| 5,977,964 A | 11/1999 | Williams et al. |
| 6,674,448 B1 | 1/2004 | Garahi et al. |
| 7,100,187 B2 | 8/2006 | Pierzga et al. |
| 7,197,071 B1 | 3/2007 | Weigand et al. |
| 8,195,515 B1 * | 6/2012 | Masewicz et al. .......... 705/14.52 |
| 2002/0104083 A1 * | 8/2002 | Hendricks et al. ............. 725/34 |
| 2003/0187730 A1 | 10/2003 | Natarajan et al. |
| 2010/0077441 A1 * | 3/2010 | Thomas et al. ............... 725/133 |

* cited by examiner

*Primary Examiner* — Thomas Dixon
*Assistant Examiner* — Gerald Vizvary
(74) *Attorney, Agent, or Firm* — Billion & Armitage; Benjamin C. Armitage (57) ABSTRACT

Apparatus and methods for dynamically producing and managing events are disclosed. In various embodiments, an event sequence generator is used to generate a production schedule or script that includes content elements and event milestones. Methods of generating a production schedule and a promotion schedule are also disclosed. The production schedule and reports based on the event can be produced and accessed remotely.

21 Claims, 9 Drawing Sheets

Add New Game Element
Fields marked with a * are required (Submit)

Name [__________] *  ← 410A
This is a Game Element Master
Never used
Type [Event ▼] * ― 405A
Status [Active ▼] * ― 406A
Time Frame [Pre-Game ▼] * ― 407A
Specific Time [__________] (?)
Time Length [1 ▼] [seconds ▼] * ― 408A
Days Available  Mon☑ Tue☑ Wed☑ Thu☑ Fri☑ Sat☑ Sun☑ * (?)
Dates Available [01/01/1970] until [12/31/9999] ☐ *
Changes Daily ☐
Element Displayed On ☑ PA Script
☑ Production Schedule
☑ Abridged Production Schedule (?)
Sponsor Name 🔍 find ― 409A
Sponsor Revenue [Event ▼]
Audio Music [__________] ― 411A
Audio FX [__________] ― 412A
Talent Names [__________] (?) ― 413A
Coordinator [__________] ― 414A
Props [__________] ― 416A
Location [__________] ― 417A
Script [__________] ― 418A Display Areas
Display 1 Main [__________] (?) ― 419A
Display 1 Overlay/Zone [__________] ― 420A
Display 2 Main [__________] ― 421A
Display 2 Overlay/Zone [__________] ― 422A
Display 3 Main [__________] ― 423A
Display 3 Overlay/Zone [__________] ― 424A
CCTV 1 [__________] (?) ― 425A
CCTV 2 [__________] ― 426A (Submit)

Notes ― 427A
[__________]

Game Recap Report
Report Results
Event Date: 08/19/2007

- Mascot Intro - In-Game: Game Segment Mid 1st ( 19-Aug-07 8:29.12 PM )
- Warden's Knot Hole Target PA: Game Segment Mid 1st ( 19-Aug-07 8:29.17 PM )
- Call Next Contestant: Game Segment Mid 1st ( 19-Aug-07 8:07.58 PM )
- Next Batter Reminder: Game Segment Mid 1st ( 19-Aug-07 8:08.05 PM )
- Season Ticket Holder of Game: Game Segment End 1st / Top 2nd ( 19-Aug-07 8:33.42 PM )
- Fresh Outdoors Project: Game Segment End 1st / Top 2nd ( 19-Aug-07 8:33.45 PM )
- Next Batter Reminder: Game Segment End 1st / Top 2nd ( 19-Aug-07 8:29.22 PM )
- Del Taco Let's Make A Deal: Game Segment Mid 2nd ( 19-Aug-07 8:40.13 PM )
- Call Next Contestant: Game Segment Mid 2nd ( 19-Aug-07 8:33.51 PM )
- Next Batter Reminder: Game Segment Mid 2nd ( 19-Aug-07 8:33.55 PM )
- Video Clip: Game Segment End 2nd / Top 3rd ( 19-Aug-07 8:43.35 PM )
- Call Next Contestant: Game Segment End 2nd / Top 3rd ( 19-Aug-07 8:40.19 PM )
- Next Batter Reminder: Game Segment End 2nd / Top 3rd ( 19-Aug-07 8:40.22 PM )
- JR PA Announcer: Game Segment Mid 3rd ( 19-Aug-07 8:51.04 PM )
- Mascot Autograph Inning: Game Segment Mid 3rd ( 19-Aug-07 8:51.07 PM )
- TD Mortgage PA: Game Segment Mid 3rd ( 19-Aug-07 8:50.56 PM )
- Next Batter Reminder: Game Segment Mid 3rd ( 19-Aug-07 8:43.55 PM )
- Kragen Auto Race: Game Segment End 3rd / Top 4th ( 19-Aug-07 9:01.54 PM )
- Birthdays: Game Segment End 3rd / Top 4th ( 19-Aug-07 9:02.07 PM )
- Group Welcome: Game Segment End 3rd / Top 4th ( 19-Aug-07 9:02.23 PM )
- Next Batter Reminder: Game Segment End 3rd / Top 4th ( 19-Aug-07 8:54.08 PM )
- California Mortgage Credit Card Promo: Game Segment Mid 4th ( 19-Aug-07 9:06.05 PM )
- Call Next Contestant: Game Segment Mid 4th ( 19-Aug-07 9:02.36 PM )
- Next Batter Reminder: Game Segment Mid 4th ( 19-Aug-07 9:02.30 PM )
- Budweiser $1 Beer Inning: Game Segment End 4th / Top 5th ( 19-Aug-07 9:13.15 PM )
- Prime Shine Express Dirtiest Car PA: Game Segment End 4th / Top 5th ( 19-Aug-07 9:13.22 PM )
- Bank of America - 5th Inning: Game Segment End 4th / Top 5th ( 19-Aug-07 9:13.09 PM )
- Next Batter Reminder: Game Segment End 4th / Top 5th ( 19-Aug-07 9:06.11 PM )
- Bank of America - Mortgage Promo: Game Segment Mid 5th ( 19-Aug-07 9:19.43 PM )
- Photo Day 2: Game Segment Mid 5th ( 19-Aug-07 9:19.52 PM )
- Next Batter Reminder: Game Segment Mid 5th ( 19-Aug-07 9:13.52 PM )
- Video Clip: Game Segment End 5th / Top 6th ( 19-Aug-07 9:31.17 PM )
- SOS Club: Game Segment End 5th / Top 6th ( 19-Aug-07 9:33.09 PM )
- Call Next Contestant: Game Segment End 5th / Top 6th ( 19-Aug-07 9:19.57 PM )
- Next Batter Reminder: Game Segment End 5th / Top 6th ( 19-Aug-07 9:20.02 PM )
- Costco Wholesale Pizza Scream: Game Segment Mid 6th ( 19-Aug-07 9:41.46 PM )
- End of Beer Sales: Game Segment Mid 6th ( 19-Aug-07 9:41.50 PM )
- Call Next Contestant: Game Segment Mid 6th ( 19-Aug-07 9:33.47 PM )
- Next Batter Reminder: Game Segment Mid 6th ( 19-Aug-07 9:33.42 PM )
- Brenden Theatres Trivia Contest: Game Segment End 6th / Top 7th ( 19-Aug-07 10:07.04 PM )
- ISP PA: Game Segment End 6th / Top 7th ( 19-Aug-07 10:07.00 PM )
- Next Batter Reminder: Game Segment End 6th / Top 7th ( 19-Aug-07 9:41.54 PM )
- 7th Inning Stretch: Game Segment Mid 7th ( 19-Aug-07 10:20.02 PM )
- Faith Night PA: Game Segment Mid 7th ( 19-Aug-07 10:19.58 PM )
- Next Batter Reminder: Game Segment Mid 7th ( 19-Aug-07 10:07.25 PM )
- John Laing Homes T-Shirt Sling: Game Segment End 7th / Top 8th ( 19-Aug-07 10:31.52 PM )
- Guaranty Bank PA Copy: Game Segment End 7th / Top 8th ( 19-Aug-07 10:31.57 PM )
- Next Batter Reminder: Game Segment End 7th / Top 8th ( 19-Aug-07 10:20.06 PM )
- Oak Valley Community Bank: Game Segment Mid 8th ( 19-Aug-07 10:41.00 PM )
- Next Batter Reminder: Game Segment Mid 8th ( 19-Aug-07 10:32.00 PM )
- Next Batter Reminder: Game Segment End 8th / Top 9th ( 19-Aug-07 10:41.02 PM )

Sponsor Report

Report Results
Sponsor Name: ADVANCE AUTO PARTS
Date Range: 05/01/2007 - 08/29/2007

5 records found

- 05/01/2007 - 2007 Wipeout - Successful: Game Segment As It Happens ( 01-May-07 7:23.54 PM )

Script:
  That's strike three and a successful advance auto parts wipeout! Everyone in attendance be sure to get a coupon at the gate and redeem it for a free gallon of windshield washer fluid, compliments of Advance A Parts. We're ready in advance!

- 05/01/2007 - 2007 Wipe out - 2 Strikes: Game Segment As It Happens ( 01-May-07 7:23.04 PM )

Script:
  That's two strikes!!! One more and we have a successful Advance Auto Parts wipeout!

- 05/02/2007 - 2007 Wipeout - Unsuccessful: Game Segment As It Happens ( 02-May-07 9:01.50 PM )

Script:
  The advance auto parts wipeout wasn't succesful during that half inning, but be sure and come back to the home game for your chance to win a free gallon of windshield washer fluid from Advance Auto Parts.

- 05/02/2007 - 2007 Wipe out - 2 Strikes: Game Segment As It Happens ( 02-May-07 9:01.57 PM )

Script:
  That's two strikes!!! One more and we have a successful Advance Auto Parts wipeout!

- 05/03/2007 - 2007 Wipeout - Unsuccessful: Game Segment As It Happens ( 03-May-07 7:43.54 PM )

Script:
  The advance auto parts wipeout wasn't succesful during that half inning, but be sure and come back to the home game for your chance to win a free gallon of windshield washer fluid from Advance Auto Parts.

SYSTEMS AND METHODS FOR DYNAMIC EVENT PRODUCTION AND MANAGEMENT

RELATED APPLICATION

This application is a Continuation application of U.S. Ser. No. 12/204,455, filed 4 Sep. 2008, which claims benefit of Ser. No. 60/0970,152, filed 5 Sep. 2007 in the United States, and which applications are incorporated herein by reference. A claim of priority to all, to the extent appropriate is made.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The information disclosed herein relates generally to systems and methods for event production and management.

BACKGROUND

The entertainment market is large, diverse and growing. Consequently, related promotional activities, which can be an important source of revenue, may grow commensurately.

BRIEF DESCRIPTION OF DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in this document.

FIG. 4C-D illustrate reports according to various embodiments of the invention.

DETAILED DESCRIPTION

Sporting events are evolving into broader entertainment events with the trend toward including an increasing mix of non-sports activities. The systems and methods used to manage such sporting events have, in general, not kept pace with event complexity. Therefore, implementation of more effective event management and production systems and methods is desirable for coordinating such entertainment events.

The inventors have realized that the quasi-regimented flow of an entertainment event, such as a sporting contest, can be used to create an ordered approach to event management and production. This includes the tracking of all event content, the ordering of all content in conjunction with established event milestones, the generation of documentation for use by all members of the event staff, e.g., production and camera staff, and generation of reports, even dynamic reports, for ownership, management, and sponsors. Additionally, the inventors have realized that there is a need for real-time management, manipulation, and viewing of an event plan. In one example, the event plan can be viewed in real-time on the internet or on an intranet. The present methods and systems can generate event plan information electronically that can be manipulated dynamically during an event in real time via internet or an intranet.

Unless the event sponsor is present at the event, the sponsor may have no way of determining whether an advertisement was actually presented. Therefore, various embodiments described herein relate to the generation of reports made accessible to the sponsor detailing delivery of advertisements. The report can include information the sponsor can use to gauge the effectiveness of an advertisement. Such reports could be accessed electronically anywhere via electronic communications by the sponsor.

Although a baseball game example is emphasised for ease in understanding the invention, various embodiments also pertain to football, basketball, soccer, hockey, lacrosse, auto, motorcycle and bicycle racing, horse and dog racing, rugby, cricket, tennis, rodeos, equestrian events, and the like. As will be appreciated by one of ordinary skill in the art after reading this disclosure, the embodiments described herein also relate, generally, to non-sporting events such as theatre, television and film productions, dog, shows, air shows, parades, state fairs, seminars, conventions and NPO events, and the like. Further, various embodiments apply to emergency management services, which may need to coordinate event activities in real time with available local resources, such as police, fire, ambulance, transportation services, and to direct the flow of people and vehicle traffic. The complexity of managing such events is illustrated by way of example below.

Figure 1:
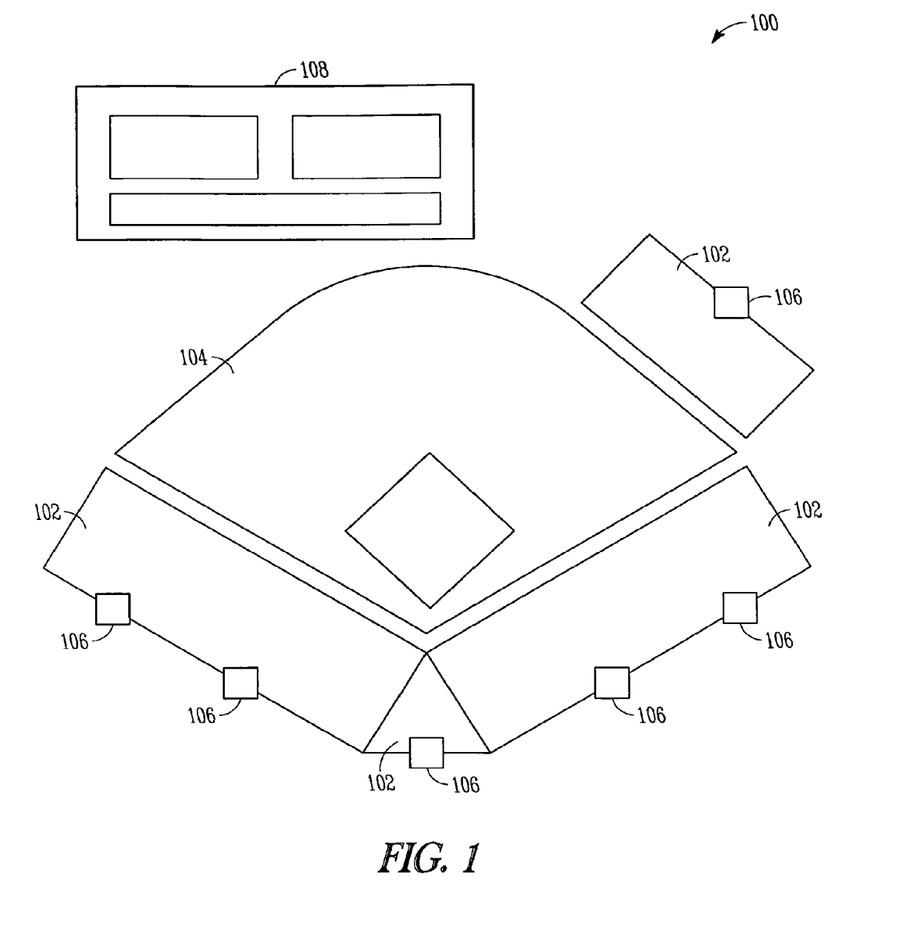
FIG. 1 is a line-drawing illustrating of a sporting venue according to various embodiments of the invention.

FIG. 1 is a line-drawing illustrating of a sporting venue according to various embodiments of the invention. Stadium 100 includes one or more seating areas 102 in which spectators can view the playing surface 104. Seating areas 102 may have one or more audio speakers 106 to provide public address, such as audio information about the game, public service messages and sponsored advertisements. Announcements, which may number in the hundreds, can be based on pre-recorded audio and video files, as well as provided in real time. Stadium 100 can include one or more displays 108 for providing advertisements, close circuit television of live action, replay activities, and score keeping. In addition, visual displays such as video display or fireworks displays, may be dispersed about the stadium for use at some specified happening, such as a home run. The fireworks displays can be further integrated with display 108 for enhancing the viewing pleasure of the audience. In between game timeouts and other such times, playing surface 104 may be used for other activities, such musical entertainment, give-aways, games of skill or chance, and the like. Further, the game itself may be integrated with live broadcast television and radio, which can require the game be managed in conjunction with commercial airtime. There may be dozens of camera, production, and support staff providing broadcast feeds to networks television and radio systems and to displays 108. The support staff associated with different broadcast media can operate independently. Therefore, it can be desirable to integrate event management on- and off-field to coordinate such activities, but there may be no interoperable communications for coordinating production among unaffiliated staff. The same may be true for the personnel responsible for providing event safety and security, which can include local government emergency management services.

In view of the above, coordination and control of all game activities can be desirable to prevent chaos, optimize game flow, and maximize the various forms of revenue available to the owner and operator of the event. Thus, there is a need to effectively manage and produce entertainment events to enhance the entertainment experience of the spectator, while maximizing income to the owner and operator.

Figure 2:
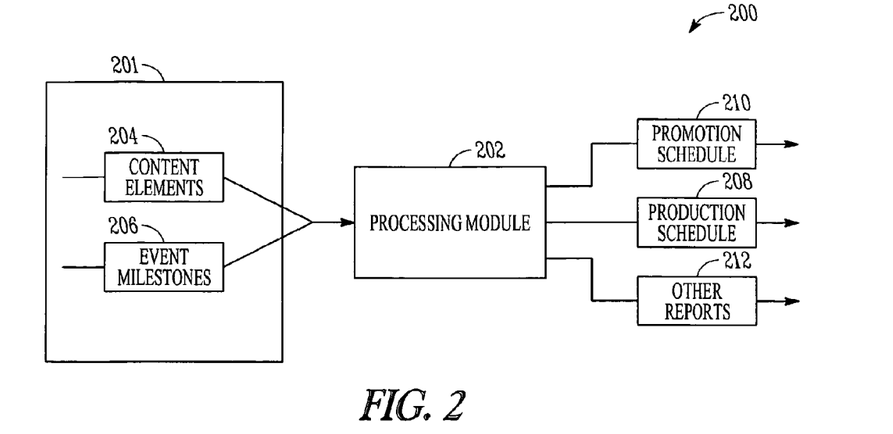
FIG. 2 is a block diagram illustrating an apparatus for providing event production and management according to various embodiments of the invention.

FIG. 2 is a block diagram illustrating an apparatus for providing event production and management according to various embodiments of the invention. In this example, apparatus 200 includes at least one process module 202 coupled to user interface module 201 to receive content elements 204 and event milestones 206. Content elements 204 are data that are used for generating a deliverable to event spectators. Event spectators can be physically present at the event and located at a remote location. Examples of content elements include, without limitation, announcements, give-aways, award presentations, audio and visual advertisements and displays, text messages, and the like. The elements 204 are based on defaults for particular elements that are found at a particular event. The elements 204 are customizable to meet are particular event or venue needs. A default element 204 can include any plurality of the following: an element number, element name, sponsor (ability to tag each part of the element with a sponsor), time length, dates and days available, mark element if it needs to be changed when used, element components, music, audio effects, props, talent, coordinator, location, customizable displays, and an ability to add fields as needed. Event milestones 206 are events that occur at specified times during a primary event, such as an event opening, an event closing, a intermission, and a time break. In the example of a baseball game, event milestones can include, without limitation, end of a first half of an inning, end of a second half of an inning, a seventh inning stretch, the national anthem, opening pitch, a pitcher's timeout, player substitution, and the like.

Milestones can be specified in association with an exact time or in time relation to another milestone. An event milestone can also change, which can cause other milestones to shift in time. Therefore, apparatus 200 can also be configured to reschedule presentation of a content element. Apparatus 200 can also provide these changes electronically over electronic communications such as wireless means, internet, or intranet. These milestones can be organized into or evolve into a script that directs the personnel during the event.

Process module 202 can be configured to generate production schedule 208, a promotion schedule 210, and other reports 212 based on content elements 204 and event milestones 206. Process module 202 can process substitutions, additions and subtractions of content elements 204 and event milestone 204 and generate a modified or updated production schedule 208, promotion schedule 210 and other reports 212. In some embodiments, process module 202 is configured to merge one or more content elements 204 with one or more event milestones 206 to produce a script to be followed at the event. These schedules and reports can be manipulated, for example changing fonts, colors, backgrounds, etc. so that the certain data and elements can be more easily recognized. Graphical interfaces can be provided that allow a user to jump to specific location in a schedule, e.g., the end of the third inning, 60 minutes before game time, at end game, etc.

Other reports 212 can include information related to the completion of event related activities. A sponsor can be provided a copy of such reports to verify that a specified advertisement was provided to a specified audience and at a specified location. Examples of other reports 212 that can be generated include global reports, content element reports, sponsor reports, game reports, promotional schedule reports, ownership reports. In some embodiments, the other reports 212 can customizable and include information generated in near real time. These reports can further be accessed electronically via a remote access. A report of all pending production schedules follows.

| TYPE | NAME | STATUS | DATE | GATE TIME | GAME TIME | LOCATION |
|---|---|---|---|---|---|---|
| Baseball | Long Beach State vs. Fullerton River Rats | Active | Apr. 24, 2007 | 4:30 PM | 6:30 PM | Blair |
| Baseball | Silver Diamonds vs. Bombers | Active | May 16, 2007 | 6:00 PM | 7:05 PM | Boykins Field |

Content elements 204 and event milestones 206 can be provided in real time or extracted from a database or other such memory store. Accordingly, production schedule 208, promotion schedule 210, and other reports 212 can be generated in real time to accommodate changes to content elements 204 and event milestones 206. Such changes can include, for example, unexpected events that occur during game play.

A sponsor can be permitted access to a copy of production schedule 208 and promotion schedule 210 to verify that a specified advertisement will be provided at a particular location. A sponsor can be limited to viewing only the portion of a production schedule 208 and promotion schedule 210 related to the sponsor's advertisement, or permitted to view the entire production schedule 208 and promotion schedule 210. Production schedule 208, promotion schedule 210, and other reports 212 can also be made accessible to federal, state and local government agencies, and to security and safety personnel for use in coordinating associated activities.

Production schedule 208 can be used to establish a delivery sequence for content elements 204 in relation to event milestones 206 as well as to ensure future content elements are properly staged, positioned and provisioned. For example, an event, producer may need to pre-stage a band scheduled to play during the seventh inning stretch of a baseball game. Among other things, the pre-stage time can include time for the band to assemble equipment, warm-up and move into position. The pre-stage time can be entered as a single content element, or as a plurality of content elements, that is then associated with the relevant event milestone. Process modules 202 can combine the pre-stage content element with an event milestone to generate a production schedule 208 that allocates the necessary time between adjacent milestones. The production schedule 208 can therefore be used to effectively organize and manage a primary event.

The production schedule 208 can further check to ensure that any game element added to the schedule does not take more time than is allotted to a specific time. As an example, the time between innings of a baseball game is shorter than the seventh inning stretch. As a result more or longer game elements can be scheduled at the seventh inning stretch than between innings.

In various embodiments, an event producer is able to generate a production schedule 208, promotion schedule 210, and other reports 212 from a remote location through a communications network. In various embodiments, production schedule 208, promotion schedule 210, and other reports 212 can be generated and delivered using a wireless network device. The production schedule 208 can provide real-time data on whether a game element is complete and highlight what the next game element is. Further, the schedule 208 can highlight the next game element that involves the specific person assigned to a particular wireless device. The schedules 208 and 210 can include live links to a sponsor's website or a buyer's guide.

Figure 3:
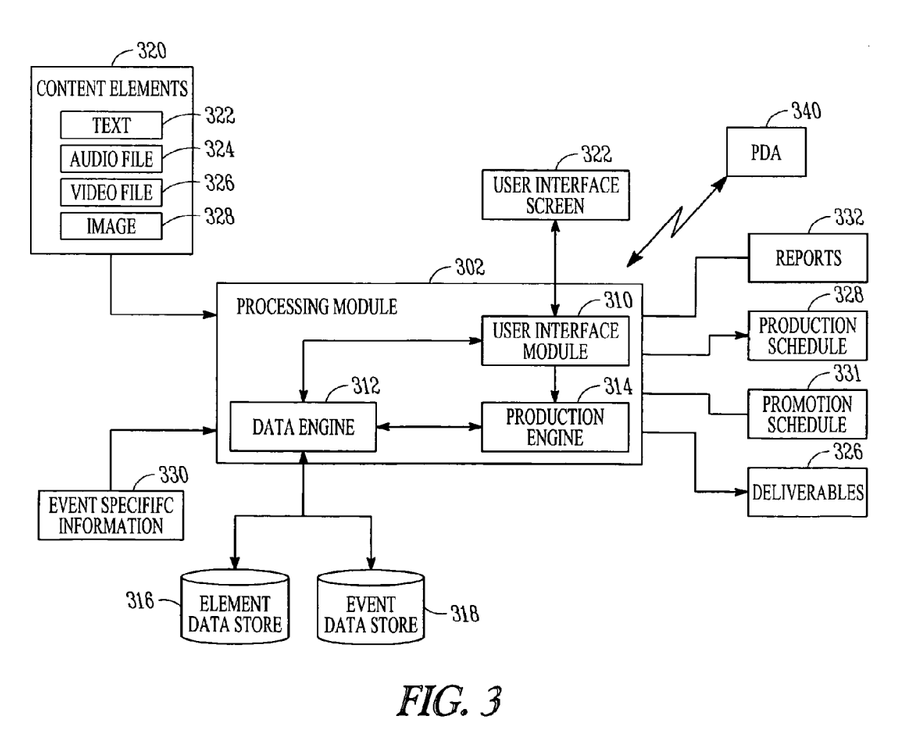
FIG. 3 is a block diagram illustrating an, apparatus for providing event production and management according to various embodiments of the invention.

FIG. 3 is a block diagram illustrating an apparatus for providing event production and management according to various embodiments of the invention. In this example, apparatus 300 contains process module 302, user interface module 310, data engine 312 and production engine 314. Process module 302 receives content elements 320 and event specific information 330. Event specific information 330 includes event milestones, such as milestones 206. Event specific information 330 may also include information obtained dynamically from online sources or retrieved from a centralized database. In various embodiments, process module 302 is configured to accept plug-in programs, such as a web browser, an email client, a media application, a graphics application, and the like, and file extensions such as .txt, .doc, .html, .zip, .xls, .pdf, .jpg, .tiff, .qpx, wma, .rpm, .mov, .mpg, and the like. In various embodiments, process module 302 is configured to accept plug-in applications based on Java™ and C++, and the like. In various embodiments, process module 302 is coupled to and application programming interface associated with Linux™, Unix™, Mac OS™, Microsoft Windows™, and the like.

User interface module 310 can be coupled to interface screen 322 to display content elements 320, event specific information 330, and production schedule 328, promotion schedule 331, and reports 332. Data engine 312 provides content elements 320 to element data store 316, and event specific information 330 to event data store 318. In various embodiments, element data store 316 includes a sponsorship inventory of content elements. In various embodiments, element data store 316 and event data store 318 include a global list of basic elements that can be used when establishing a new sponsor account or new event. Content elements 320 and event specific information 330 can be provided by a user or a computer. Content elements 320 can include one or more text files 322, audio files 324, video files 326 and image files 328. In various embodiments, element data store 316 and event data store 318 are located on one data store. A wireless device 340, such as a personal digital assistant (PDA), a Palm™, an IPhone™, and a Blackberry™ can be coupled to the process module 302 to enable, bi-directionally communication with a remote user.

Process module 302 includes a production engine 314 that is configured to combine content elements 320 and event specific information 330 and to generate production schedule 328, promotion schedule 331, and reports 332. In various embodiments, production schedule 328 is production schedule 208, promotion schedule 331 is promotion schedule 210, and reports 332 are other reports 212. The promotion schedule 331 can include information related to game-day information. In some embodiments, the promotion schedule 331 and the production schedule 328 are similar except that the promotion schedule 331 includes game-day related information. Production engine 314 can receive instructions from user interface module 310 to retrieve content elements 320 and event specific information 330. Production engine 314 can also be configured to match one or more content elements 320 with at least one event specific information 330 to provide one or more deliverables 326. The matching of content elements 320 with event specific information 330 can be based on an algorithm that determines whether a specified content element is compatible with a specified event milestone. Deliverables 326 include a production schedule as described above, an abridged production schedule, a PA script, and user executable code. User executable code is a software application that can run on a computing device to control the delivery of content elements 320 to a device such as a speaker 108 and a display 108. In various embodiments, process module 302 includes hardware configured to execute machine readable instructions. Process module 302 can also be configured to generate one or more reports 332 identifying the content elements that were presented at corresponding event milestones. Reports 332, production schedule 328 and promotion schedule 331 can be made accessible to sponsors and federal, state and local government, security and safety personnel, as describe above.

In some embodiments, one or more reports 332 includes data that can be used to track sales activity at an event. Here, process module 320 can be coupled to a secure data store containing a time record of sales activity at the event, for example, cash register sales and credit card sales tallied during the event in relation to a timestamp. The timestamp and the report can enable a sponsor to correlate sales activity with the presentation of an advertisement.

The process module 302 can include a sponsor inventory module to enable a sponsor, or another, to monitor available content elements. The process module 302 can also include a module containing one or more production task lists, which can be configured to schedule tasks for staff and run reports to determine which tasks were completed and which are incomplete.

Figure 4A:
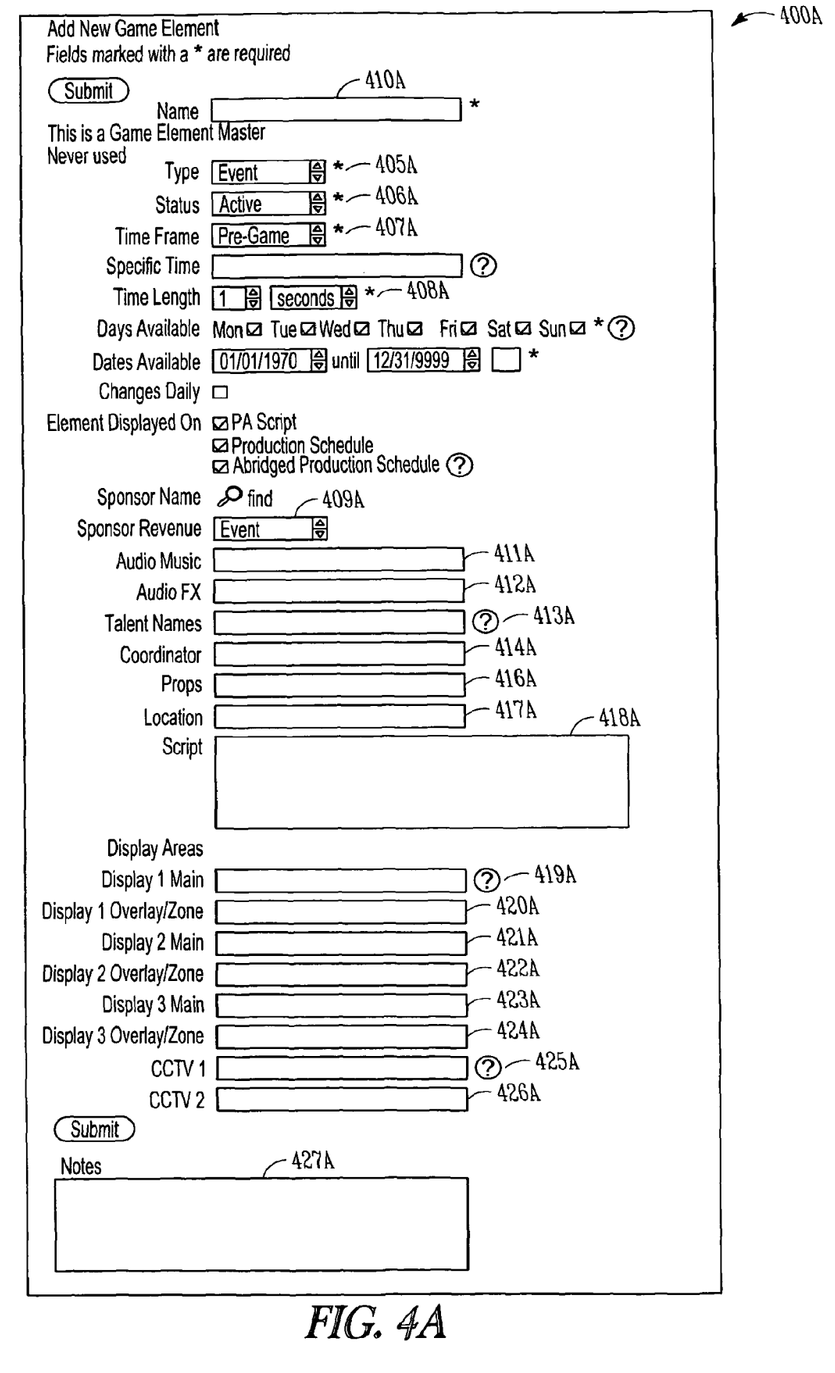
FIG. 4A-B illustrate user interface templates according to various embodiments of the invention.
Figure 4B:
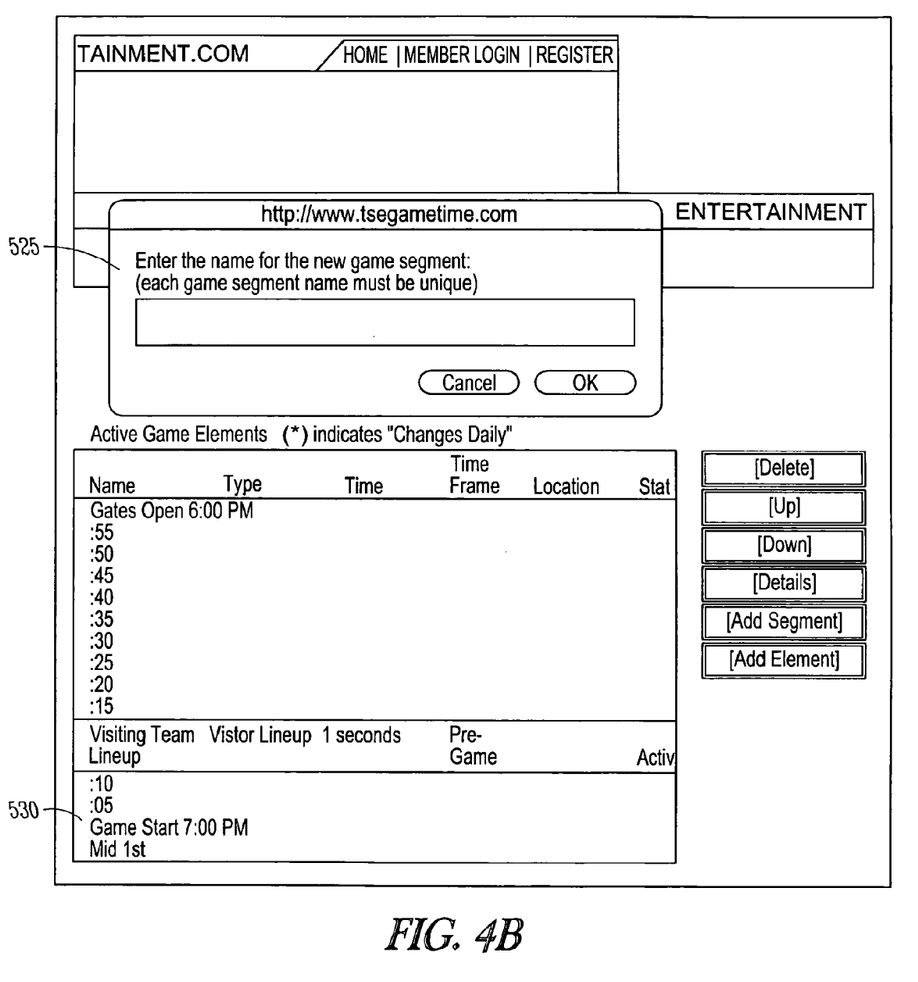

FIG. 4A-B illustrate user templates according to various embodiments of the invention. It is to be understood that templates 400A-B are illustrative of possible arrangements and is not are meant to be limiting to the particular arrangement shown. For example, the template can be made customizable to enable a user to rename, select for display or use, and reorder one or more fields.

Template 400A contains a plurality of selectable data fields related to event milestones. Template 400A enables the entering and editing of content elements, such as content elements 204 and 320, as described above and illustrated in FIGS. 2 and 3. Template 400A includes pull-down menus 405A-409A and text entry boxes 410A-427A. Pull-down menu 405A contains a listing of primary events, e.g., baseball, football, basketball, etc., and may include a listing of sub-menus, such as professional, semi-professional, college, high school, and the like. The pull-down menus of the present invention can be used to initiate loading of another template, to update a current template, and to redirect entry of content elements and event milestone event to other templates. In various embodiments, one or more pull-down menu use a script, such as Javascript™, or an application such as Adobe Flash™ that can support scripting. In various embodiments, text entry boxes 411A and 412A provide a means for entering an upload link for an audio file.

Text entry boxes 418A can be used to provide an event announcer the precise language to be used at a selected event milestone. In various embodiments, text entered in box 418A is transmitted to an image recognition device and converted to an audio file to be played automatically at the selected event milestone. Template 400A includes boxes 419A-426A that can be used to allocate or direct the playing of video files, such as advertisements, to a display. In various embodiments, boxes 419A-426A are configured to accept an upload link for video and image files that are to be displayed at a specified event milestone.

FIG. 4B illustrates a template for modifying a production schedule. Using template 400B, a milestones event or content element can be added to the production schedule by entering the appropriate text in display window 425B. Upon entry, the new milestone event and content element can inserted into the existing production schedule at the designated time and a new production schedule can be generated. Milestone events and content elements can likewise be deleted by entering the appropriate text. In various embodiments, an applet is used to determine the compatibility of an event milestone and a content element, and to alert the user in the event of any incompatibility. For example, an audio file intended to be played during a game time-out with a length that exceeds the available time can be flagged so that it can be rescheduled. An alert can also be provided where a sponsor of one advertisement has requested that certain other advertisements not be played sequentially. Here, for example, a sponsor may not want a contest to precede or follow a specified advertisement.

Figure 4D:
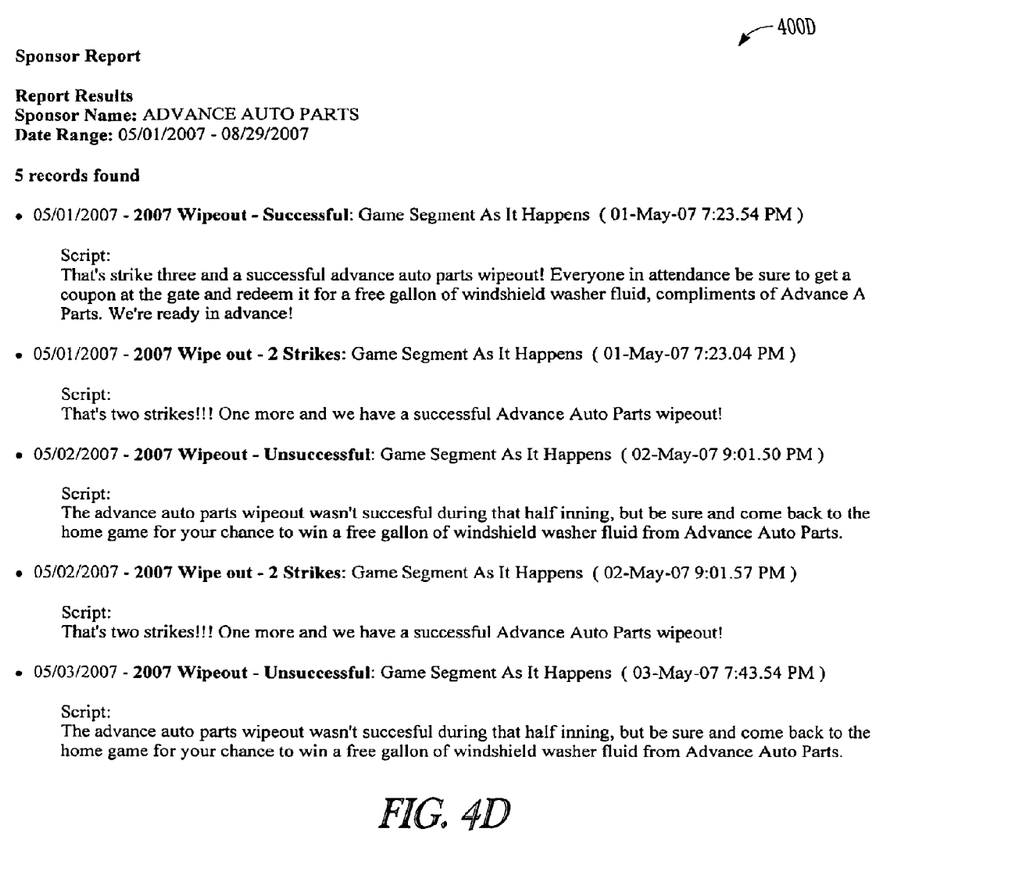

FIGS. 4C-4D illustrate output reports according to various embodiments of the invention. It is to be understood that reports 400C-D are illustrative of possible arrangements and are not are meant to be limiting to the particular arrangements shown. Moreover, the dates provided in the reports are not intended to suggest dates of invention, but are merely example dates.

Report 400C includes a listing of content elements displayed in association with event milestones for a baseball game. The content elements, which are not listed in the order provided, include video and audio content related to sponsored advertisement and public announcements. Report 400C can be also display content elements in association with event milestones. In various embodiments, report 400C is presented in electronic format enabling content elements to be displayed alphabetical, by length, sponsorship, and the like. In various embodiments, the content elements and event milestones are displayed and arranged in association with colored fonts or highlighting to provide for a quick visual identification. For example, alcohol advertisements can be all one color, food all another color, and financials all a third color. All of the milestone events and content elements are loaded into the present system and a report 400C is generated. Report 400C shows the ancillary event for each of the associated milestones. Report 400C further shows the latest revision of the ancillary event. In one example, see 450, the season ticket holder of the game ancillary event is to be held at the game segment at the end of the first inning before the start of the second inning. This ancillary event was set at 8:33 pm on 19 Aug. 2007 in this example. At 460, a video clip is played. At 470, a public address is made on behalf of a sponsor, TD mortgage. Other ancillary events or promotions are listed on FIG. 4C.

Report 400D includes a listing of sponsored content elements displayed in association with event milestones for a baseball game. In this example, the report also includes the text that was presented enabling the sponsor to verify accuracy. In various embodiments, report 400D includes sales activities, such as product volumes and sales dollars generated in relation to the time the advertisement was presented. Although not shown in 400D, the report can include information indicating the location of the speaker and the display where the associated content element was presented at the event. The sponsor report provides a report for a specific sponsor, here by way of example, Advance Auto Parts is the sponsor. Report 400D shows the records of the ancillary events that are sponsored by a particular sponsor. The records includes scripts and or the audio/visual components that are associated or linked to a particular event milestone, such as a game segment.

Figure 5:
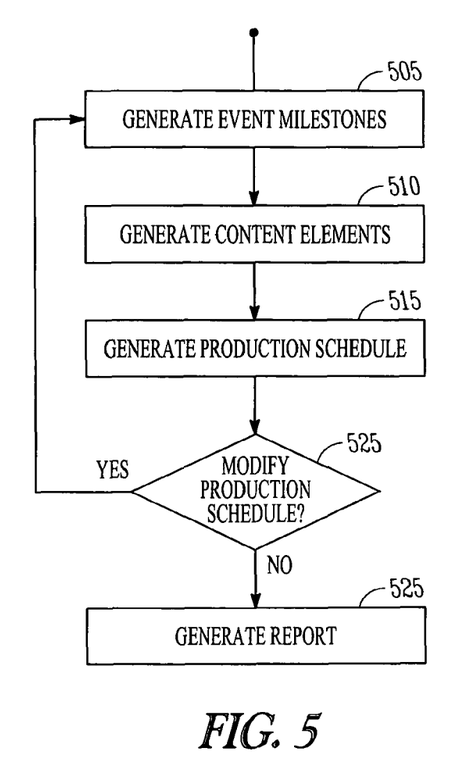
FIG. 5 is an illustration of a method according to various embodiments of the invention.

FIG. 5 illustrates a method of event production and management according to various embodiments of the invention. Method 500 begins at block 505 with a process module generating event related information that includes event milestones. Event milestones can include an event name or type, a start time and a related event duration. The type can be a contest, an announcement, a video spot, an audio spot, home line-up, visitor line-up, birthdays, group recognition, and the like.

Event milestones can be predetermined or specified in near real time. Predetermined milestones can be assembled or structured in the form of a template maintained in a database. The template can be partitioned by subject matter containing a plurality of placeholders to be completed by the user. Event milestones specified in real time can be entered into a text document or a spreadsheet. In various embodiments, the spreadsheet contains macros that are used to calculate and propagate information. The template can also be formatted according to the requirements of an event. The template can also include selectable default conditions, such as a sequence of game innings. In various embodiments, event milestones are presented as a series of pull-down menus on the template. In various embodiments, the event producer can structure the template without knowledge of content elements.

In various embodiments, the template contains information retrieved from another database, such an electronic database made accessible by a third party, for example, game dates, times and locations published by the owner/operator of the event. Here, pull technology such as a web crawler or web robot can be used to automatically search for relevant data. In various embodiments, push technology is used to enable a third party the ability to provide template related information that can be stored in a database for later use.

At block 510, one or more content elements, such as elements 204 and 320, are provided by a user or a computer and input to the process module. The content elements can be entered into a template or other such user interface. In various embodiments, content elements are entered through a web interface or retrieved from a data store. Content elements for a sponsor can be added to a data store by a sales person for retrieval by a process module. A user, such as an event producer, can be provided a listing of the sponsored content in the data store to be included in the primary event. In various embodiments, sponsored content entered by a sales person is automatically inserted into the relevant event milestones according to an algorithm. The algorithm can recognize placeholders and allotted times and merge content that is a best fit. Criteria determining a best fit can be based on, a sponsor's requirements and demands, for example, advertisements to be played in between specified game innings.

At block 515, a production schedule is generated by the process module and output to a device for viewing. An algorithm can be used to limit entry of content element to an allotted time slot and to provide an alert of an incompatibility with an event milestone. An incompatibility can occur where there is a conflict among content elements, such scheduling as multiple content elements for the same event milestone, conflict among sponsor requirements and demands, and where the length of a content element exceeds the available time period of an event milestone.

At block 520, the user is permitted to modify the production schedule. Modification to a production schedule can be a change in event milestone, a content element, or both. The user is permitted to add, subtract or alter exiting event milestones and content elements in near real time. A new or updated production schedule can be generated based on the modification. The resulting production schedule may advance or delay the presentation of content elements to account for the modification.

The production schedule can also be used to generate an abridged production schedule and PA scripts. The production schedule can be generated as executable code delivered to a user through any suitable means, such as through a web enabled browser. In various embodiments, the production schedule is a printable electronic file such as a text file, a spreadsheet application and a formatted web page.

At block 525, if modification to the production schedule is not desired, a production report can be generated. The report can be specific to the sponsor to enable the sponsor to verify that content was presented at appropriate time. The report can also include a record of sales activity before, during and after a sponsor's content was presented. Such sales activity can be in text, graphical, and spreadsheet format. The report can be made accessible to a sponsor in tangible form and electronically over a network in near real time. The report, therefore, may be useful to a sponsor for gauging the effectiveness of the content presented.

In various embodiments, method 500 is performed on an apparatus such as apparatus 200 and 300, as described above and illustrated in FIGS. 2 and 3.

Figure 6:
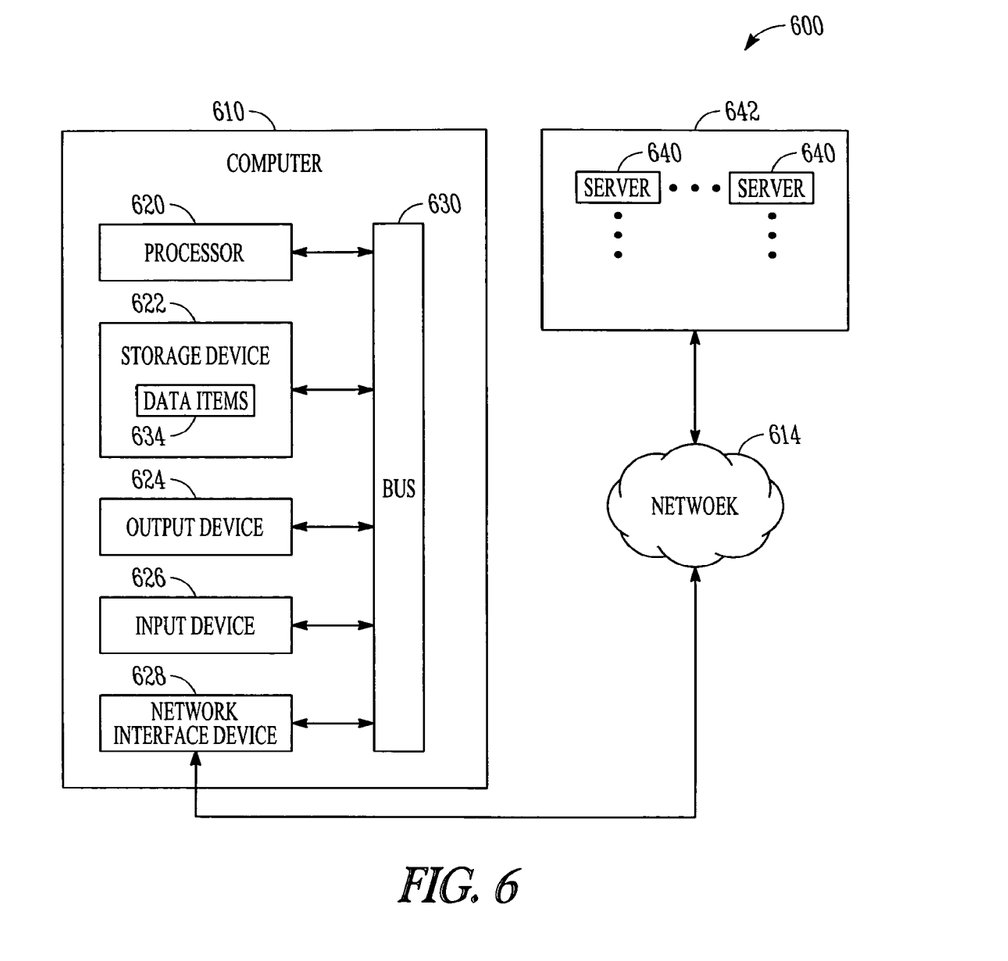
FIG. 6 is a block diagram illustrating a machine for performing any one or more of the methodologies described herein.

FIG. 6 is a block diagram illustrating a machine for performing any one or more of the methodologies described herein. Here, system 600 includes a computer 610 connected to network 614. Computer 610 can be, for example, a personal computer, a laptop, a notebook, a main frame computer, and a PDA. Connected by bus 630 to processor 620 are storage device 622, output device 624, input device 626, and network interface device 628. Processor 620 can be of any architecture capable of using machine-readable media, such as a complex instruction set computing processor (CISC), a reduced instruction set computing processor (RISC), and a very long instruction word processor (VLIW). Processor 620 can further include a control module to schedule movement of data in and out of storage device 622, as well movement of data between the devices 622, 624, 626 and network 614.

Processor 620 can be configured to generate a production schedule, such as schedule 208, a promotion schedule, such as schedule 210, and other reports, such as reports 212. Processor 620 can also be configured to provide content, such as deliverables 326. In various embodiments, processor 620 includes a process module, such as module 202 and module 302, as described above and illustrated in FIGS. 2 and 3. In various embodiments, a process module such as module 202 and module 302 is located in a device, such as a computer or a processor coupled to computer 610 at network interface device 628. In various embodiments, content elements 204 and event milestones 206 are generated by another computer and provided to computer 610 as a software application. In various embodiments, a software application containing one or more of content elements 204, event milestones 206, production schedule 208, promotions schedule 210, and other reports 21 are provided to computer 610 over network 614.

Storage device 622 can be any suitable device capable of storing data, including devices using magnetic media, optical media, and semiconductor memory. Storage device 622 can include data items 634, such as content elements 204 and 320, and event milestones 206 and information 330. Storage device 622 is not limited to computer 610, but can be a storage device coupled to network 614. In some embodiments, storage device 622 includes a copy of the production schedule 208, the promotion schedule 210, and other reports 212.

Output device 624 can be any device capable of providing viewable content. For example, output device 624 may be a liquid crystal display, a plasma-based flat-panel display, projection display, and a cathode-ray tube device. Although one output device 624 is shown, a plurality of output devices can be used. In various embodiments, output device 624 is a device, such as user interface screen 322.

Input device 626 can be used to enter data for further processing and storage. Input device 626 may be a keyboard, a pointing device, a trackball, a touchpad, a touch screen, a keypad, a gamepad, a microphone, a voice recognition device, and the like. Although one input device 626 is shown, any number and type of input devices can be used. In various embodiments, the input device 624 is a device used for entering content elements 204 and 320, and event milestones 206 and information 330.

Network interface device 628 can be configured to provide connectivity between computer 610 and network 614 using any suitable communications protocol. Examples of communications protocols include wireless protocols, such as the Institute of Electrical and Electronics Engineers (IEEE) 802.11a/b/g/h/i/j and IEEE 802.16e-2005, Ethernet IEEE 802.3x-xx, and the Transmission Control Protocol and Internet Protocol (TCP/IP). Network 614 can be the Internet, an intranet, a local area network (LAN), a wide area network (WAN), a cellular network based on Global System for Mobile Communications (GSM) and Code Division Multiple Access (CDMA), General Packet Radio Service (GPRS), Enhanced Data rates for GSM Evolution (EDGE), and Universal Mobile Telecommunications System (UMTS). Although one network 614 is shown, one or more networks of the same or different types may be coupled to computer 610.

Network 614 can be coupled to a file server 640 storing content elements and event milestones. Server 640 can include one or more modules, such as interface module 310, process module 202, and process module 302 to provide computer 610 with production schedule 208, promotion schedule 210, and other reports 212. In various embodiments, network 614 includes file server 640. In various embodiments, server 640 is a server mirrored storing content elements and event milestones as backup. In various embodiments, network 614 is coupled to a server farm 642 containing a plurality of servers, such as server 640 to provide redundancy. Each server 640 in the server farm 642 can be coupled to a different network 614 to provide a high level of network redundancy as well as data redundancy. Computer 610 can be configured to ping each server 640 and maintain a directory of operational networks 614 and servers 640 to be accessed in the event of a server or network failure. In various embodiments, computer 610 maintains a hierarchy of servers and networks that can be automatically placed in primary communication with computer 610.

Figure 7:
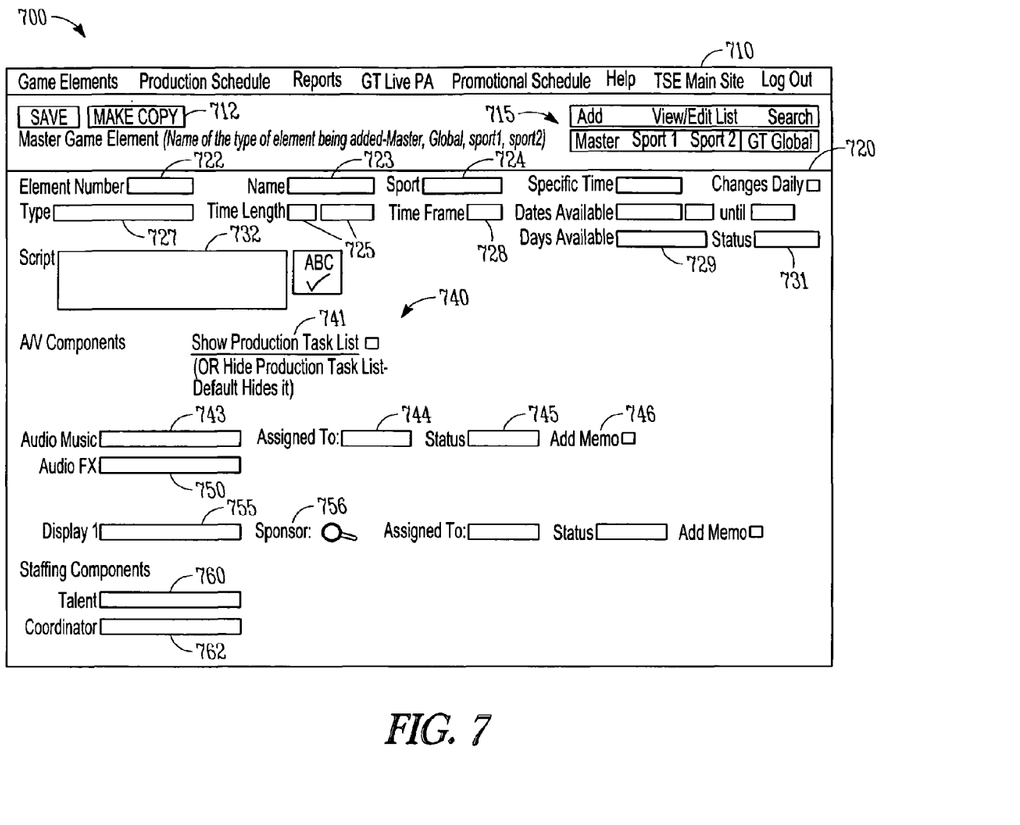
FIG. 7 is a user interface for use with embodiments described herein

FIG. 7 shows a display of a user interface 700 that can be displayed on the output device 624 and accept data via input device 626. Interface 700 includes a main header 710 that has various links to other user interfaces such as game elements, production schedule, reports, game time live public address, promotional schedule, help, main website, and logout. The game element interface is shown here. The other main header links will display similar user interfaces to allow the user to generate reports as described herein, produce a production schedule as described herein, produce a promotional schedule as described herein, input a live public address announcement, etc. The master game element interface 700 is shown which does not allow the user to alter this interface as it is a template. Hence, the save button is inactive, i.e., "greyed out". The user can make a copy of this interface at 712. A sub-header 715 provides the user with additional commands. Turning now to the main displayed frame 720, there are shown various data fields that can be used to define a game element. While the present discussion of FIG. 7 refers to a game, it will be understood that interface 700 would work similarly for other events and the present inventions is not limited to games. The frame 720 includes an element number field 722, a name field 723, a sport or event field 724, a specific event time field 725 to uniquely identify a given game element. The sport field 724 allows the user to define whether the game element being created is a master element for multiple events, is an element for a specific sport, or is a global element for all events. For example, a lineup element might be appropriate for a baseball or football game, but not for a non-sporting event. The specific event time field 725 shows the time segment rundown. It is desirable to know additional data about the game element. The frame includes a type field 727, a time length field, and a time frame field 728. The type field 727 includes what the game element is, e.g., an event, a contest, a PA read, a video spot, an audio spot, a home player lineup, a visiting player lineup, birthday announcements, group announcements, public service announcements, marriage proposals, and other types. The time frame field 728 indicates where in an event or game the game element should occur. The data entered into field 728 can include pregame, ingame, post game, drop in, spontaneous, as it happens, or other times appropriate to a given event. A days available field 729 shows when the game element is available, e.g., everyday, Mondays, Tuesdays, Wednesdays, every game, every other game, some defined game interval. A status field 731 allows the user to define the rights for other users to access the game element can be viewed, e.g., show always, hide, delete, deactivate, etc. A script field 732 allows the user to insert the text required in a game element and update the memory to produce the reports and schedules described herein.

As described herein, embodiments of the present invention allow audio and visual elements to be loaded and part of the schedules being created. The frame 720 includes an A/V components area 740. A production task list link 741 is provided that when selected by the user, a task list for a given game element is provided. In the example of fireworks being the A/V component, the task list may include the safety checklist and a direction to load the music that will accompany the fireworks. An audio music field 743 is provided that allows a name of a music file to be input. The task of uploading music is assigned to a person in field 744. This person is then responsible for uploading the music prior to the need for the music during the event. The user must then indicate the status of the music upload in field 745. The status field 745 provides data in the present methods and systems that can be run to provide an incomplete task report before the event takes place. Thus the event coordinator can have a report that focuses the efforts to complete incomplete tasks and not check all tasks and elements to find those that are not complete. A memo field 746 can be provided with memos. As shown the memo field 746 is reduced in size as a memo is not always required. A further audio component of a game element is an audio sound effect, which can be input at field 750. The A/V components include visual components as well and display field 755 provides an input. A sponsor link 756 is provided that opens a sponsor list that is used to link the display to a given sponsor. Like the audit music field, video field display field 755 includes assigned to a person field, a complete/incomplete field, and a memo field.

Events can further require people, such as announcers, mascots, special guests, celebrities, camera crews, in crowd announcer, organ player, etc. to be part of a given game element. A talent field 760 identifies who needs to be involved in this game element. A coordinator field 762 is provided that identifies who is responsible for having the talent in the correct location and ready to perform when the game element occurs.

The game elements can be stored and used over again. The database of the game elements can be searched and sorted by any of the data fields. For example, if a certain is available, then the game elements could be searched for game elements that meet that time requirement and fill the missing game element. This may allow the event organizer to fill all possible promotional opportunities and maximize revenue by selling more advertising. A list of possible saved game elements follows.

| TYPE | NAME | STATUS | TIMEFRAME |
|---|---|---|---|
| PA Read | 1 minute notification | Active [Deactivate] | In-Game [View] |
| Contest | 3 legged race | Active [Deactivate] | In-Game [View] |
| PA Read | Advanced Auto Parts | Active [Deactivate] | In-Game [View] |
| Contest | Alex's Promo | Active [Deactivate] | In-Game [View] |
|  | America Dental Service |  |  |
| Event | Angels in the Outfield | Active [Deactivate] | In-Game [View] |
| Contest | Baseball Bingo | Active [Deactivate] | In-Game [View] |
| Event | Baseball Buddies | Active [Deactivate] | In-Game [View] |
| Event | Birthday | Active [Deactivate] | In-Game [View] |
| Contest | Blue Cross Sling Shot | Active [Deactivate] | In-Game [View] |
| Contest | Bob Fisher Tug of War | Active [Deactivate] | In-Game [View] |
| First Pitches | Ceremonial First Pitch | Active [Deactivate] | Pre-Game [View] |
| PA Read | Coke Announcement | Active [Deactivate] | Pre-Game [View] |
| PA Read | Courtesy | Active [Deactivate] | In-Game [View] |

-continued

| TYPE | NAME | STATUS | TIMEFRAME |
|---|---|---|---|
| Event | Entrance of Color Guard | Active [Deactivate] | Pre-Game [View] |
| Event | Field of Dreams Team | Active [Deactivate] | Pre-Game [View] |
| First Pitches | First Pitch | Active [Deactivate] | Pre-Game [View] |
| PARead | Foul Ball | Active [Deactivate] | As It Happens [View] |
| Event | Mascot Shines Bald Guys Head | Active [Deactivate] | In-Game [View] |
| Home Lineup | Home Lineup | Active [Deactivate] | As It Happens [View] |
| Event | Honorary Bat Boy | Active [Deactivate] | Pre-Game [View] |
| Contest | Hotdog Race | Active [Deactivate] | In-Game [View] |
| Contest | Human Bowling | Active [Deactivate] | In-Game [View] |

The use of game elements and their associated fields provides a single location to change the data that will then propagate through all schedules and reports that use that game elements. For example, if a talent listed in field 760 changes for a game, then the talent name changes in each subsequent schedule and report. As another example, changes in a script are entered in field 732, then these changes occur in subsequently run schedules and reports.

As will be appreciated by one of ordinary skill in the art, various embodiments also include one or more elements provided in Appendices A-S.

In an embodiment an event sequence generator includes a milestone generator to provide a listing of event milestones. The event sequence generator also includes an interface module for entering content elements for association with the event milestones. The event sequence generator also includes a process module configured to generate a production schedule based on the content elements and the event milestones.

In an embodiment a method includes generating event milestones and generating content elements for association with the event milestones. The method also includes generating a production schedule adapted to accept modifications to the content elements and event milestones. The method also includes generating a report associated with the production schedule.

In an embodiment a system includes a computer having a milestone module for receiving event milestones, an interface module for receiving content elements for association with the event milestones, and a process module to generate a production schedule that includes the content elements and event milestones. The computer is coupled to a network.

In an embodiment a machine readable medium having machine-executable instructions that, when performed cause one or more process modules to store event milestones and to receive content elements for association with the event milestones. The instruction also cause the process modules to generate a production schedule including the content elements and the event milestones, and to generate a report based on the production schedule.

The presently described methods, systems, and devices enable the efficient production of modern event. The present disclosure enables introduction of changes or additions to the schedule/script from any computer with an internet connection and appropriate access to the software and database. A user will be able to enter and manage individual events for all aspects of a sporting event's script. The user will build an event specific production schedule that allows real time changes throughout the event. From this schedule you can: 1. view an always up to date master production schedule in an internet browser window; 2. print an abridged production schedule(s) for your field/floor staff to carry; 3. print a PA script that can be updated to adapt to current changes in the live event with a few mouse clicks; 4. download and save all of the above schedules/scripts for use in commonly used formats such as Word or Excel; and 5. operate a dashboard which will (a) eliminate the need for paper PA Scripts, (b) allow real time changes to the PA schedule/script, (c) allow spontaneous additions to the event script, or (d) provide sponsor/game reports by tagging each event with a time/date stamp when it is completed.

It will be recognized that methods described herein could be stored on computer readable media such as tangible electronic, optical, or magnetic media. Such media could include machine-executable instructions that, when performed cause one or more process modules to: store event milestones; receive content elements for association with the event milestones; generate a production schedule including the content elements and the event milestones; and generate a report based on the production schedule. The machine readable medium could further comprises a module to generate a promotion schedule. The machine readable medium could further comprise instructions to generate from a customizable template. The machine readable medium could further comprise instructions to generate at least one of a sponsor report, game report, promotion schedule report.

The above Detailed Description is intended to be illustrative, and not restrictive. Accordingly, the various embodiments described herein may be implemented with software, firmware, or hardware. The various embodiments are not necessarily mutually exclusive, as some embodiments can be combined with one or more other embodiments to form new embodiments. For example, the above-described embodiments (and/or aspects thereof) embodiments may be combined, utilized and derived therefrom, such that structural and logical substitutions and changes may be made without departing from the scope of this disclosure. Such embodiments of the inventive subject matter may be referred to herein, individually and/or collectively, by the term "invention" merely for convenience and without intending to voluntarily limit the scope of this application to any single invention or inventive concept if more than one is in fact disclosed. Many other embodiments will be apparent to those of skill in the art upon reviewing the above description. The scope of the invention should, therefore, be determined with reference to the appended claims, along with the full scope of equivalents to which such claims are entitled.

The methods described herein do not have to be executed in the order described, or in any particular order, unless it is otherwise specified that a particular order is required. Moreover, unless otherwise specified, various activities described with respect to the methods identified herein can be executed in repetitive, simultaneous, serial, or parallel fashion.

The term "module" refers to software, hardware and firmware components may be known to one of ordinary skill in the art. The terms "a" or "an" are used, as is common in patent documents, to include one or more than one. The term "or" is used to refer to a nonexclusive or, unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring the abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment

The invention claimed is:

1. A live event sequence generator apparatus, comprising:
a milestone generator including a processor, the milestone generator to provide a listing of live event milestones;
an interface module to enter content elements for association with the live event milestones;
a processor to generate electronically a production schedule, prior to the live event, based on the content elements from the interface module and the live event milestones from the milestone generator such that content elements are to be performed based on the production schedule; and
a memory to store the production schedule for the live event;
wherein the processor is to modify the production schedule as needed during the live event and electronically send a modified production schedule to personal devices when the modified production schedule is produced.

2. The event generator apparatus of claim 1, wherein the processor includes a promotion module to load promotional data prior to the future live event or change promotional data prior to the live event milestone that triggers a promotion at the future live event using the promotional data.

3. The event generator apparatus of claim 2, wherein the interface module is configured to receive a customizable template to receive the content elements or set the live event milestones prior to the live event.

4. The event generator apparatus of claim 3, wherein the customizable template includes an event identifier, a specific event time identifier, a script field, and an audio/video field.

5. The event generator apparatus of claim 4, wherein the production schedule includes an ordered listing of all content elements based on data input into the customizable template.

6. The event generator apparatus of claim 4, wherein the production schedule includes links to sponsor websites.

7. The event generator apparatus of claim 6, wherein the processor is configured to provide a report based on the content elements and the event milestones of the production schedule and the live event.

8. The event generator apparatus of claim 7, wherein the milestone generator is to provide a listing of event milestones.

9. The event generator apparatus of claim 7, wherein the milestone generator is to determine milestones related to a broadcast of the live event.

10. The event generator apparatus of claim 9, wherein the content elements include entertainment events separate from the live event.

11. The event generator apparatus of claim 9, wherein the live event is a baseball game and event milestones includes half inning changes and the ceremonial first pitch.

12. The event generator apparatus of claim 9, wherein the content event includes at least one of an announcement, a give-away, an audio advertisement, length of content event, prop, talent list, or combinations thereof.

13. A method of generating a production schedule for a future live event, comprising:
generating event milestones prior to the event;
generating content elements for association with the event milestones;
generating a modifiable, live event production schedule using the content elements and the event milestones;
generating a report associated with the production schedule; and
updating and distributing the production schedule during the live event when an event milestone, content element or both change during the live event.

14. The method of claim 13, wherein generating a modifiable production schedule includes generating with a customizable template to receive the content elements or set the live event milestones prior to live event, wherein generating content elements includes inputting talent that must perform at a given event milestone, and wherein generating event milestones includes providing a time period during which a content element is expected to occur.

15. The method of claim 13, wherein generating the production schedule includes checking a content element to ensure that it can be performed during a time period.

16. The method of claim 13, wherein generating the production schedule includes flagging all event milestones that do not have a completed content element associated with that event milestone.

17. The method of claim 13, wherein generating a report includes generating at least one of a sponsor report, game report, promotion schedule report, or combinations thereof.

18. The method of claim 13, wherein generating a modifiable production schedule includes loading promotional data prior to the live event or changing promotional data prior to the live event milestone that triggers a promotion at the future live event using the promotional data; and wherein
generating a modifiable, live event production schedule includes receiving a customizable template to receive the content elements or set the live event milestones prior to the live event.

19. The method of claim 18, wherein the live event is a baseball game and event milestones includes half inning changes and the ceremonial first pitch, and wherein the content event includes at least one of an announcement, a give-away, an audio advertisement, length of content event, prop, talent list, or combinations thereof.

20. The method of claim 19, further comprising integrating the production schedule into at least one of an audio system, a video system, and a message board of the baseball game to trigger content elements at times of sporting event milestones based on the production schedule.

21. A live event sequence generator apparatus, comprising:
a milestone generator including a processor, the milestone generator to provide a listing of live event milestones;
an interface module to enter event content elements for association live event milestones;
a processor to generate electronically a modifiable live event script, prior to the live event, based on the content elements and the live event milestones; and
a memory to store the script for the live event, wherein the processor is to modify the script as needed during the live event based on a change to a content element and electronically send a modified production schedule to personal devices when the modified script is produced.

* * * * *